(12) United States Patent
Veix

(10) Patent No.: US 8,002,011 B2
(45) Date of Patent: Aug. 23, 2011

(54) TOP SEAL DRIVER ASSEMBLY

(75) Inventor: Scott Veix, Bradenton, FL (US)

(73) Assignee: KHS GmbH, Dortmund (DE)

( * ) Notice: Subject to any disclaimer, the term of this patent is extended or adjusted under 35 U.S.C. 154(b) by 325 days.

(21) Appl. No.: 12/428,252

(22) Filed: Apr. 22, 2009

(65) Prior Publication Data

US 2010/0269452 A1    Oct. 28, 2010

(51) Int. Cl.
*B32B 37/00* (2006.01)
(52) U.S. Cl. .......................... 156/580; 156/583.1
(58) Field of Classification Search .............. 156/228, 156/580, 581, 583.1; 100/315, 280, 281, 100/293, 294
See application file for complete search history.

(56) References Cited

U.S. PATENT DOCUMENTS

| | | | |
|---|---|---|---|
| 3,553,934 A | 1/1971 | Johnson | 53/183 |
| 4,959,989 A * | 10/1990 | Obrecht et al. | 72/450 |
| 5,080,747 A | 1/1992 | Veix | 156/352 |
| 6,389,940 B1 * | 5/2002 | Long et al. | 83/23 |
| 7,153,128 B2 * | 12/2006 | Hasegawa | 425/590 |

* cited by examiner

*Primary Examiner* — James Sells
(74) *Attorney, Agent, or Firm* — Andrew Wilford

(57) ABSTRACT

The invention relates to top seal driver assembly for sealing the top opening of a pouch comprising
 Motor means for driving a rocker bar mounted on a central drive shaft,
 the rocker bar being connected on opposite ends to an outer seal rod drive bar and to an inner seal rod drive bar,
 the outer seal rod drive bar being connected to outer seal drive rods, and
 the inner seal rod drive bar being connected to inner seal drive rods,
 the outer and inner seal drive rods being supported in a box frame with bearing means, wherein
 outside dovetail bars are mounted to the outer seal drive rod and inner dovetail bars are mounted to the inner seal drive rod, wherein
 seal bar assemblies are mounted to the dovetail bars, wherein
 the box frame contains the central drive shaft, the rocker bar, the outer and inner seal rod drive bars and the outer and inner seal drive rods.

11 Claims, 5 Drawing Sheets

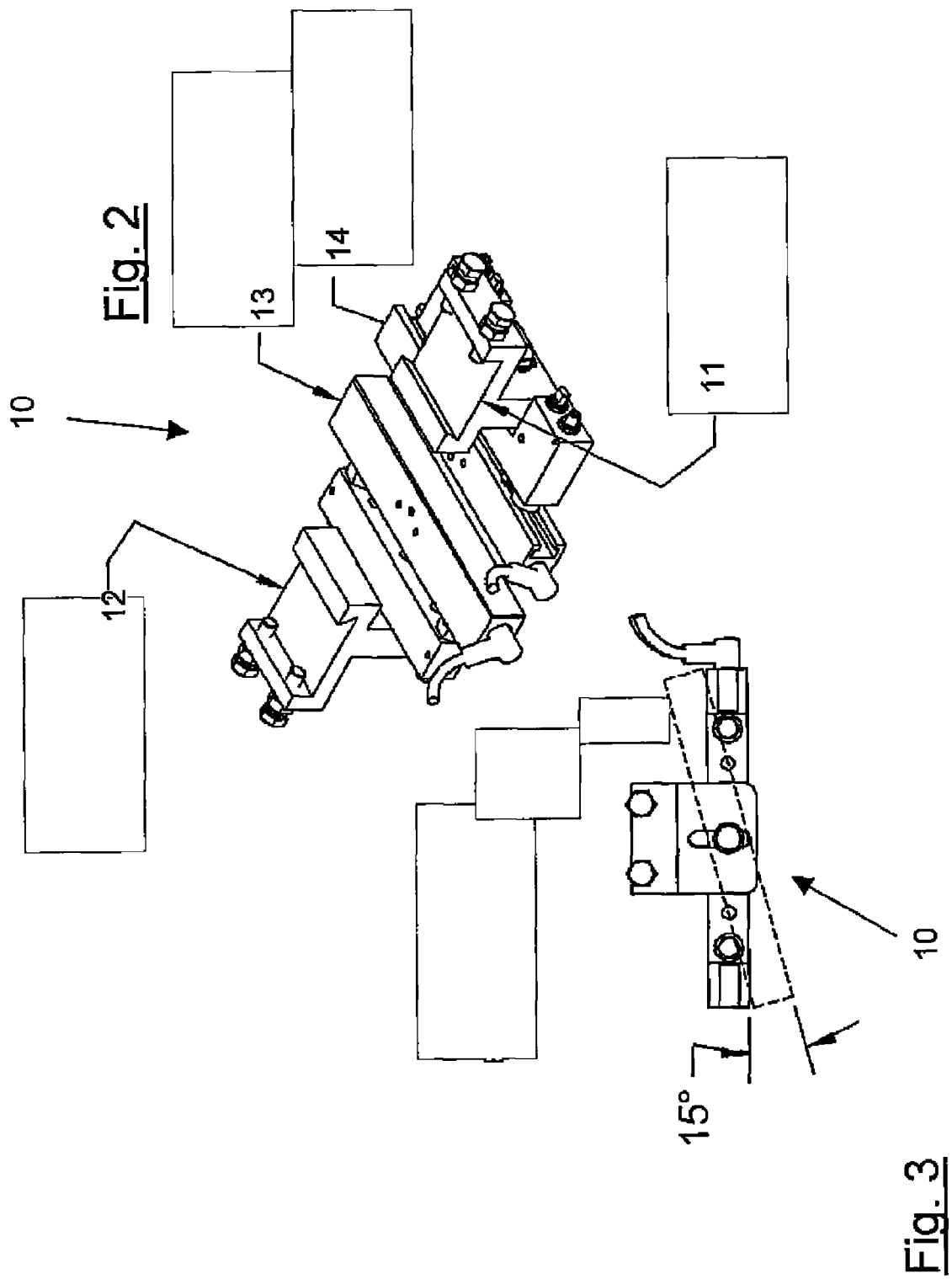

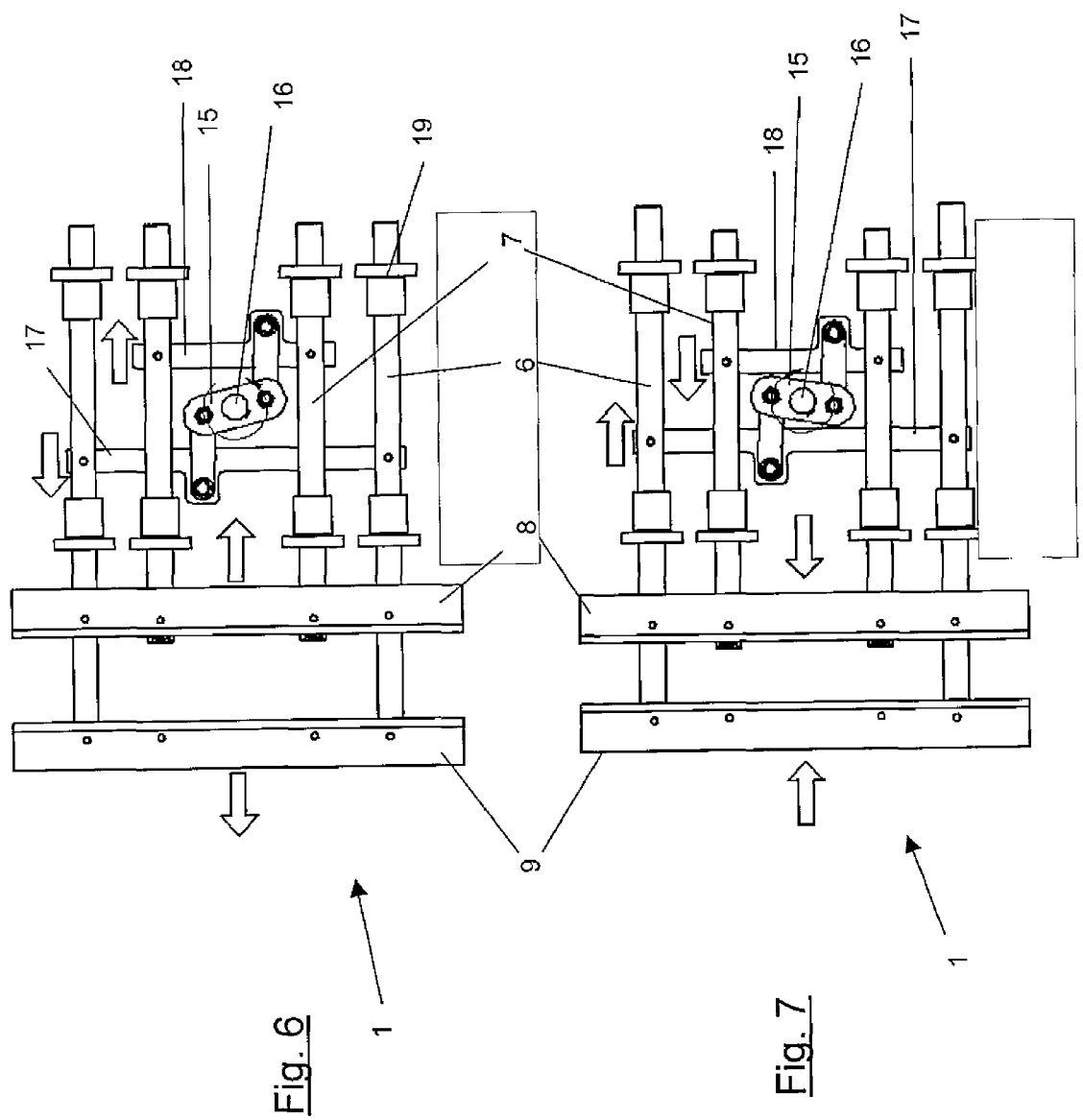

TOP SEAL DRIVER ASSEMBLY

FIELD OF THE INVENTION

The present invention relates to a top seal driver assembly. More particularly this invention concerns a heat sealing mechanism for use in a packaging machine for forming a top seal of a pouch.

BACKGROUND OF THE INVENTION

U.S. Pat. No. 5,080,747 discloses a mechanism for forming spaced seals in an elongated heat-sealable strip adapted to be advanced intermittently along a predetermined path, the mechanism comprising a support, a pair of heated sealing bars located on opposite sides of the strip, means mounting the sealing bars on the support for linear movement toward and away from the strip, means for normally moving the bars linearly toward and into engagement with the strip when the strip dwells and for retracting the bars linearly away and out of engagement with the strip before the next advance of the strip, the moving means normally retracting the bars a short predetermined distance away from the strip, and means for retracting the bars linearly away from the strip through a greater distance to a parked position and for keeping the bars in the parked positioning response to an abnormal condition interrupting the advance of the strip. Therefore U.S. Pat. No. 5,080,747 discloses a mounting for side and bottom sealing devices.

To seal the top opening of a pouch after filling on a pouching machine system, a series of opposing heat bars or ultrasonic bars need to be actuated against each other accurately and with enough pressure to accomplish an acceptable seal. This actuation may also need to drive a multiple of different bar assemblies such as pre-heat bars to prepare the seal area for a final seal, a final top seal bar set to complete the seal and possibly cooling bars to cool the hot sealed area of the pouch. The top seal driver must accommodate any combination of these bars and allow linear and angular adjustment to create a quality pouch top seal and must allow the bars to mount up and down stream to match pitch.

SUMMARY OF THE INVENTION

The general aim of the present invention is to provide a new and improved driving technique or a top seal driver assembly to produce a similar linear action in a self contained enclosed box unit mounting top sealing devices upon, reducing the wear on drive components and allowing high forces and high cycle rates to be generated.

According to the invention the top seal driver assembly comprises motor means for driving a rocker bar mounted on a central drive shaft. The rocker bar is connected on opposite ends to an outer seal rod drive bar and to an inner seal rod drive bar. The outer seal rod drive bar is connected to outer seal drive rods, and the inner seal rod drive bar is connected to inner seal drive rods. The outer and inner seal drive rods are supported in a box frame with bearing means, wherein outside dovetail bars are mounted to the outer seal drive rod and inner dovetail bars are mounted to the inner seal drive rod, wherein seal bar assemblies are mounted to the dovetail bars, wherein the box frame contains the central drive shaft, the rocker bar, the outer and inner seal rod drive bars and the outer and inner seal drive rods.

The motor means comprises a servo motor/gear box output to angular motion of the rocker bar, wherein the motor means drive the central drive shaft which is connected to the rocker bar.

The rocker bar is connected to the inner and outer seal rod drive bars by connecting bars. The connecting bars are connected to opposite ends of the rocker bar and to the inner and outer seal rod drive bars.

The outer seal rod drive bar is rigidly connected to two outer seal drive rods each located at the outer edges of the box frame. The inner seal rod drive bar is rigidly connected to two inner seal drive rods each located at the inner part of the box frame.

Advantageously the outer seal drive rod and the inner seal drive rod are supported in the front and rear of the box frame with linear supporting bearings at end areas of the outer and inner seal drive rods.

Suitably environment seals are mounted where each of the outer and inner seal drive rods extends outside the box frame.

The seal bar assembly comprises a front dovetail mount and a rear dovetail mount. The front dovetail is mounted to the inner dovetail bar. The rear dovetail mount is mounted to the outer dovetail bar. The front dovetail mount comprises a spring loaded front bar set, wherein the rear dovetail mount comprises a fixed bar.

This and other objects and advantages of the invention will become more apparent form the following detailed description when taken in conjunction with the accompanying drawings.

BRIEF DESCRIPTION OF THE DRAWINGS

FIG. 2 shows seal bar assembly in detail in a perspective view,

FIG. 3 shows the seal bar assembly according to FIG. 2 in a front view,

FIG. 6 shows a bar opening actuation, and FIG. 7 shows a bar closing actuation.

DETAILED DESCRIPTION OF THE PREFERRED EMBODIMENT

Figure 1:
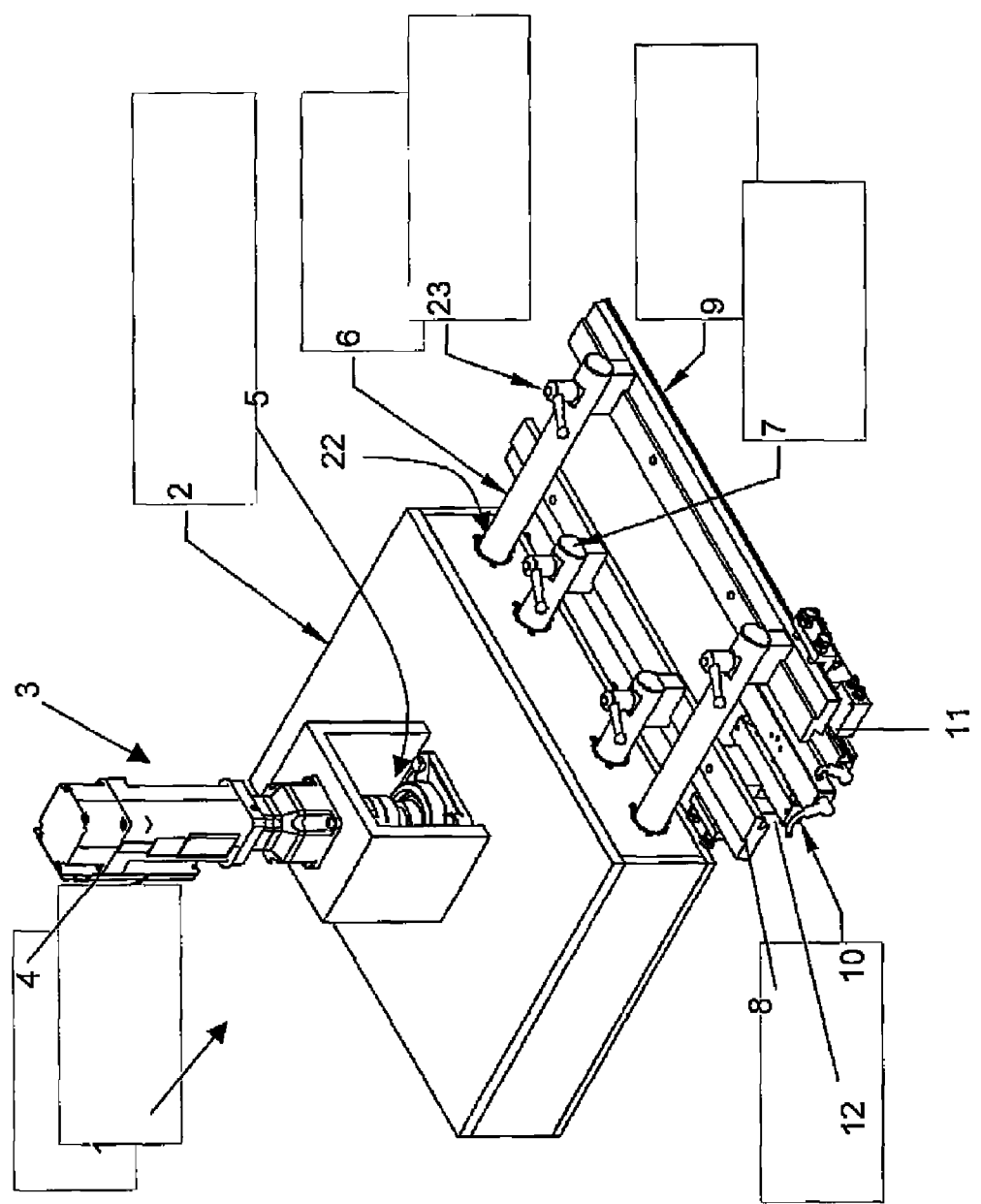
FIG. 1 shows a top seal driver assembly.

The unit or the top seal driver assembly 1 according to the invention as shown in FIG. 1 consists of a box frame 2 or top seal drive housing 2 containing all the drive components which are driven by motor means 3 comprising a servo motor 4 and gearbox 5. Extending from the box frame 2 are two sets of seal drive rods 6,7 which actuate opposing each other, when one set is extending the other is retracting. Attached to the ends of these outer and inner seal drive rods 6, 7 are two quick release dovetail bars 8, 9. Any desired seal bar assembly can be mounted onto these dovetail bars 8, 9 and the seal bar assemblies 10 can be slid up and down stream to match the pitch of the machine. Inner and outer dovetail bars 8, 9 can be configured for a particular sealing requirement and can be quickly changed in and out to reduce changeover time for different machine requirements with dovetail quick release handles 23.

FIG. 2 shows the seal bar assembly 10 in detail. The seal bar assembly 10 comprises a front dovetail mount 11 and a rear dovetail mount 12. The rear dovetail mount has a fixed bar 13, wherein the front dovetail mount 11 has a spring loaded bar 14. The front dovetail mount 11 can be mounted to the inner dovetail bar 8, whereby the rear dovetail mount 12 can be mounted to the outer dovetail bar 9, or inverted, what is not identifiable in FIG. 2 but in FIG. 1.

The seal bar assembly 10 can be mounted anywhere along the dovetail bars 8, 9 and can accommodate pre-heat sealing requirements, final sealing requirements and cooling bar assemblies. The front dovetail mount 11 is spring loaded to accommodate variations in thickness and location and the rear dovetail mount 12 is fixed or solid to allow the floating spring loaded bar to align with it when closing. The linear drive rods or the inner and outer seal drive rods 6, 7 move the front and rear dovetail mounts 11, 12 or the seal bar assemblies against each other to produce a quality top seal.

The dovetail mounts 11, 12 are also designed to accommodate other variations of top seal methods such as ultrasonic sealing assemblies.

The seal bar mount or assembly 10 allows for vertical adjustment to tweak position of the top seals and allows for up to 15-degrees for example of tilting to allow accommodation for tilted top seal requirements on single bag clamp style pouching machines, as shown in FIG. 3, so that the bar con rotate for adjustment.

Figure 4:
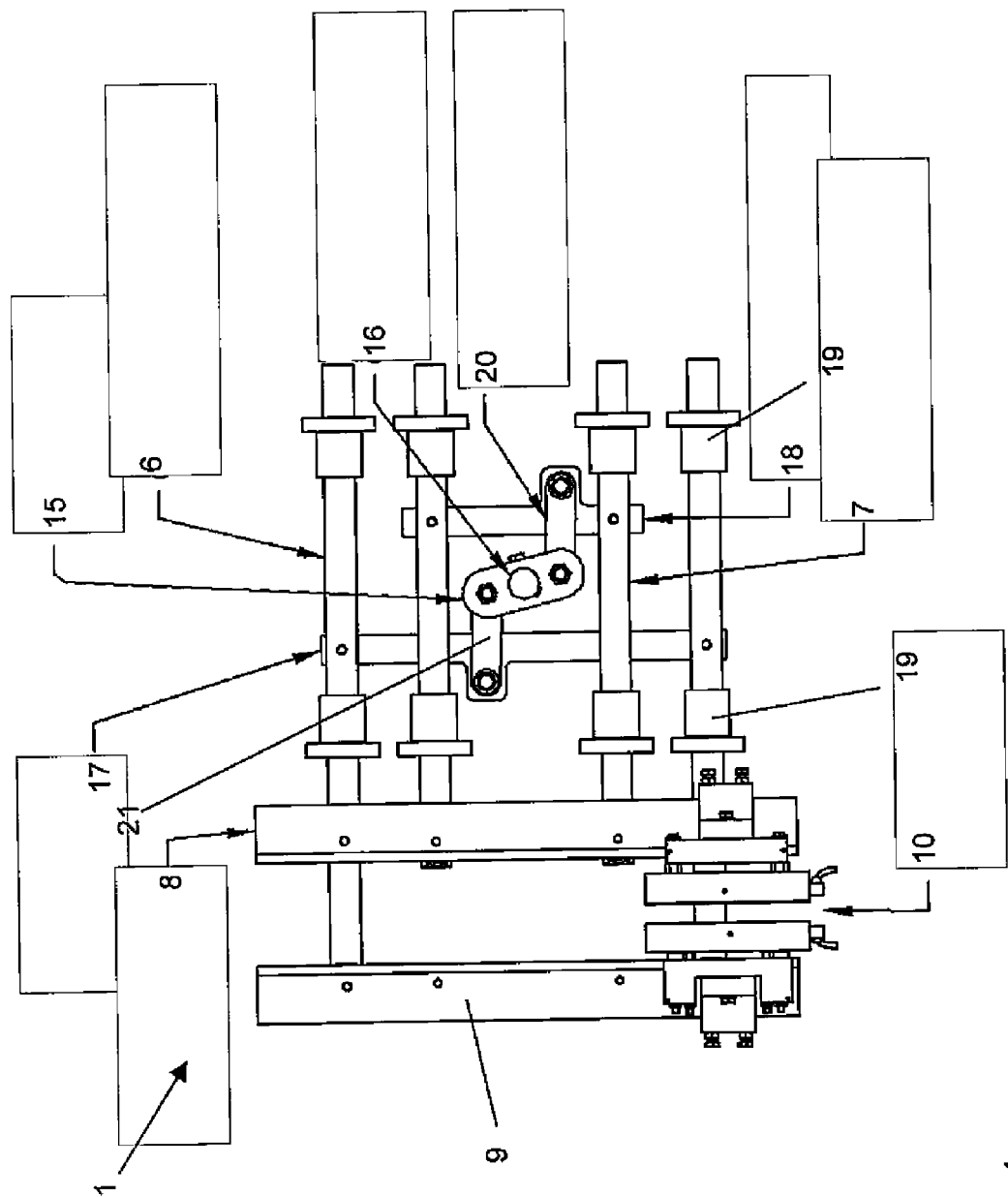
FIG. 4 shows the top seal driver assembly in a top view without box frame.
Figure 5:
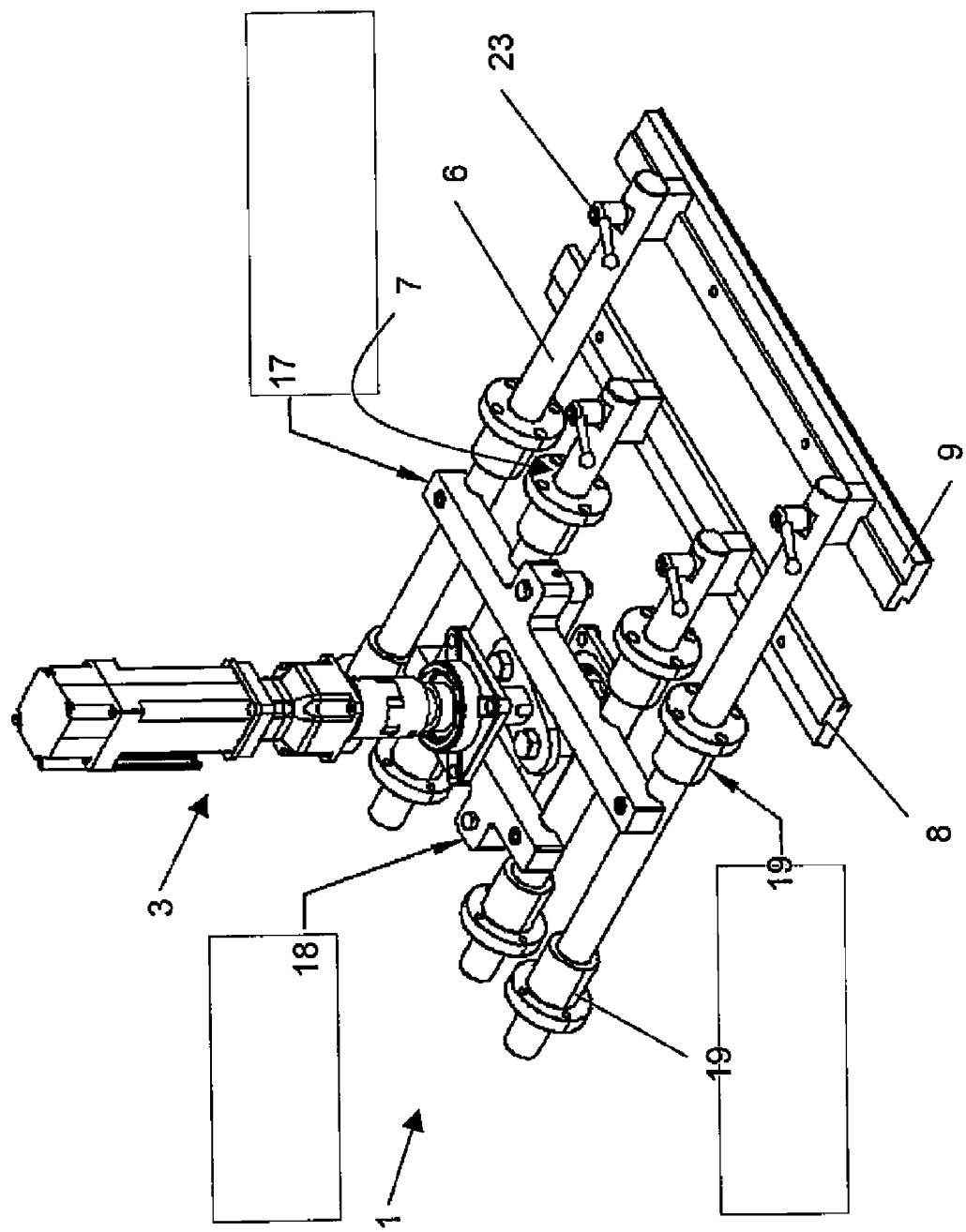
FIG. 5 shows the top seal driver assembly according to FIG. 4 in a perspective view.

As one can see in FIG. 4 the internal components of the box frame 2, which is removed in FIG. 4, in order to have proper view to the inside, transfer the rotary motion of the servo motor/gearbox 4, 5 output to angular motion of a rocker bar 15 mounted on a central drive shaft 16, that is connected on opposite ends to a outer seal rod drive bar 17 and to a inner seal rod drive bar 18. The outer seal rod drive bar 17 is rigidly connected to the two large round outer seal drive rods 6 at the outer edges of the not shown box frame 2. The inner seal rod drive bar 18 is rigidly connected to the two large round inner seal drive rods 7 at the inner part of the not shown box frame 2. These four seal drive rods 6, 7 are supported in the front and rear of the not shown box frame 2 with linear support bearings 19 to keep them aligned and rigid.

The outside dovetail bar 9 is mounted to the outer seal drive rods 6 and the inside dovetail bar 8 is mounted to the inner seal drive rod 7. The seal bar assemblies 10 are mounted to the dovetail bars 8, 9. As the central drive shaft 16 rotates, it pushes connecting bars 20, 21, connecting the rocker bar 15 and the outer and inner seal rod drive bars 17, 18, forwards and backwards, thus moving the seal rod drive bars 17, 18 in opposite directions. This in turn moves the inner seal drive rods 7 in one direction and the outer seal drive rods 6 in the opposite direction, as one can see in FIGS. 6 and 7. This causes the driving motion of bringing the seal bars together and apart as the machine cycles as the servo motor/gearbox cycles by partially rotating in one direction and then reversing. FIG. 6 shows a bar opening action, whereby FIG. 7 shows a bar closing action. The different actions are identifiable by the respective movement arrows.

An added benefit of the servo motor/gearbox drive is, as the machine halts, the drive can move the dovetail mounts further apart from each other to prevent the over heating or scorching of the pouch web material as the machine sits idle and the seal bars continue to remain hot. This eliminates a reject pouch at the seal station(s) each time the machine stops.

The seal rod drive bars 17, 18 connected to the seal drive rods 6, 7 not only holds them firmly in place but prevents them from rotating in the linear bearings 19. Environment seals 22 (FIG. 1) are mounted where each of the seal drive rods 6, 7 extends outside the box frame 2 preventing contamination from affecting the drive system and making the unit more durable in dusty or dirty environments.

Because there is so little motion during the sealing cycling the wear on the drive components is greatly reduced. The rigid mounting of all the moving components along with everything being self contained in the box frame, allows for high forces and high cycle rates to be generated and accurately controlled while transferring little to no motion or loading to any exterior framing or mounting.

The modular top seal driver assembly 1 can be mounted in a number of methods to provide access to the top seal area of pouches on a pouching machine. The modular self-contained system allows for easy adaptively to existing pouching machines and ease of incorporation into new machine designs.

REFERENCE

1 Top seal driver assembly
2 Box frame/housing
3 Motor means
4 Servo motor
5 Gear box
6 Outer seal drive rod
7 Inner seal drive rod
8 Inner dovetail bar
9 Outer dovetail bar
10 Seal bar assembly
11 Front dovetail mount
12 Rear dovetail
13 Fixed bar
14 Spring loaded bar
15 Rocker bar
16 Central drive shaft
17 Outer seal rod drive bar
18 Inner seal rod drive bar
19 Linear bearing
20 Connecting bar
21 Connecting bar
22 Environment seal
23 Quick release handle

I claim:

1. A top seal driver assembly for sealing the top opening of a pouch comprising
   Motor means for driving a rocker bar mounted on a central drive shaft,
   the rocker bar being connected on opposite ends to an outer seal rod drive bar and to an inner seal rod drive bar, the outer seal rod drive bar being connected to outer seal drive rods, and
   the inner seal rod drive bar being connected to inner seal drive rods,
   the outer and inner seal drive rods being supported in a box frame with bearing means, wherein
   outside dovetail bars are mounted to the outer seal drive rod and inner dovetail bars are mounted to the inner seal drive rod, wherein
   seal bar assemblies are mounted to the dovetail bars, wherein
   the box frame contains the central drive shaft, the rocker bar, the outer and inner seal rod drive bars and the outer and inner seal drive rods.

2. The top seal driver assembly according to claim 1, wherein the motor means comprises a servo Motor/gear box output to angular motion of the rocker bar.

3. The top seal driver assembly according to claim 1, wherein the rocker bar being connected on opposite ends to the outer seal rod drive bar and to the inner seal rod drive bar by connecting bars.

4. The top seal driver assembly according to claim 1, wherein the outer seal rod drive bar is rigidly connected to two outer seal drive rods each located at the outer edges of the box frame.

5. The top seal driver assembly according to claim 1, wherein the inner seal rod drive bar is rigidly connected to two inner seal drive rods each located at the inner part of the box frame.

6. The top seal driver assembly according to claim 1, wherein the outer seal drive rods and the inner seal drive rods each is supported in the front and rear of the box frame with linear supporting bearings at each end area of the outer and inner seal drive rods.

7. The top seal driver assembly according to claim 1, wherein environment seals are mounted where each of the outer and inner seal drive rods extends outside the box frame.

8. The top seal driver assembly according to claim 1, wherein a front dovetail mount is mounted to the inner dovetail bar, the front dovetail mount comprises a spring loaded front bar set.

9. The top seal driver assembly according to claim 1, wherein a front dovetail mount is mounted to the outer dovetail bar, the front dovetail mount comprises a spring loaded front bar set.

10. The top seal driver assembly according to claim 1, wherein a rear dovetail mount is mounted to the outer dovetail bar, the rear dovetail mount comprises a fixed bar.

11. The top seal driver assembly according to claim 1, wherein a rear dovetail mount is mounted to the inner dovetail bar, the rear dovetail mount comprises a fixed bar.

* * * * *